W. H. RICHARDS.
PNEUMATIC TIRE.
APPLICATION FILED JAN. 21, 1920.
1,362,187.
Patented Dec. 14, 1920.
2 SHEETS—SHEET 1.
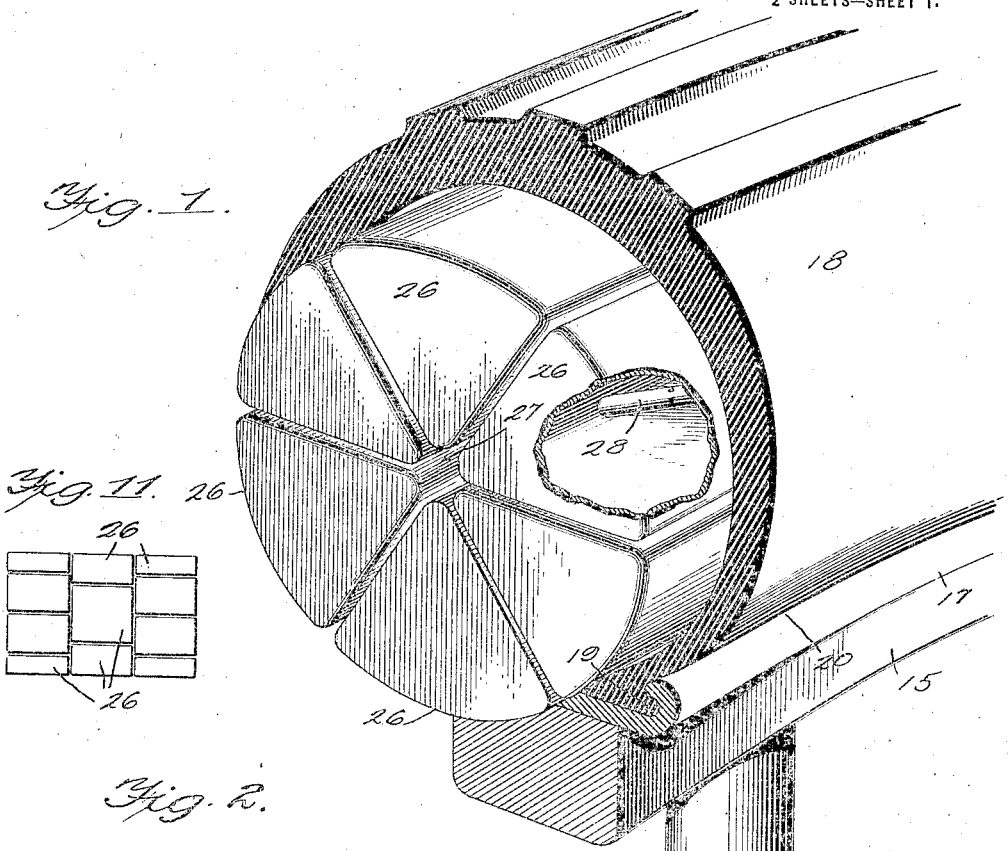
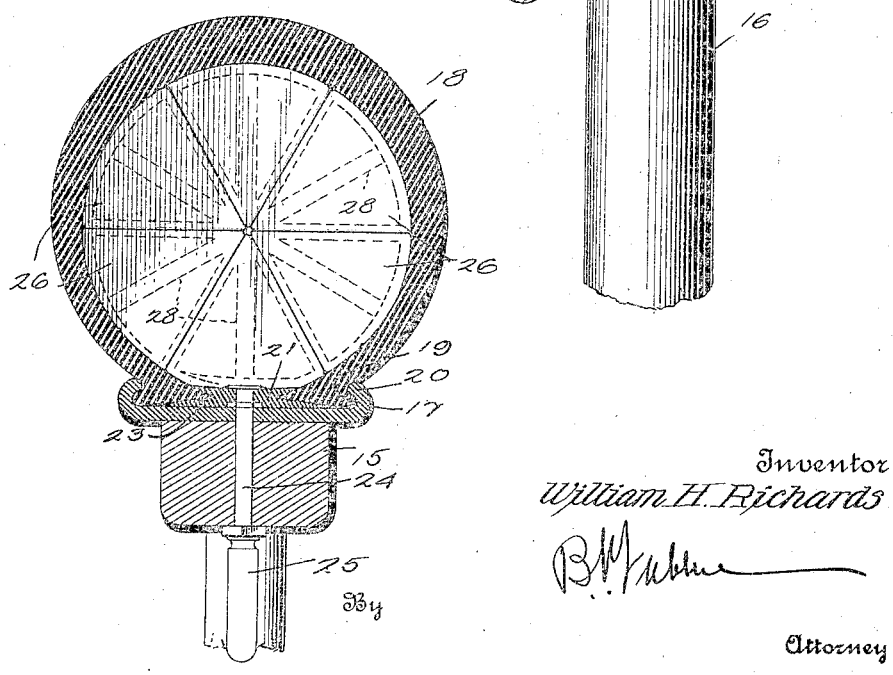
Inventor
William H. Richards
Attorney W. H. RICHARDS.
PNEUMATIC TIRE.
APPLICATION FILED JAN. 21, 1920.
1,362,187.
Patented Dec. 14, 1920.
2 SHEETS—SHEET 2.
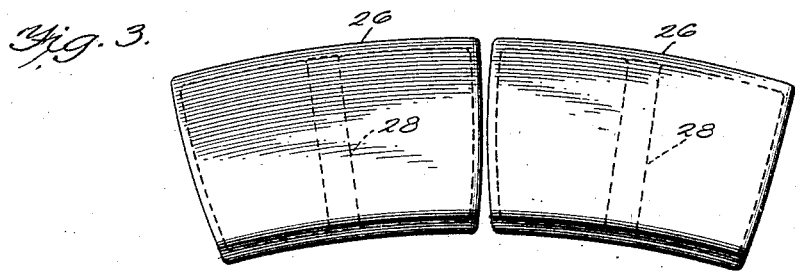
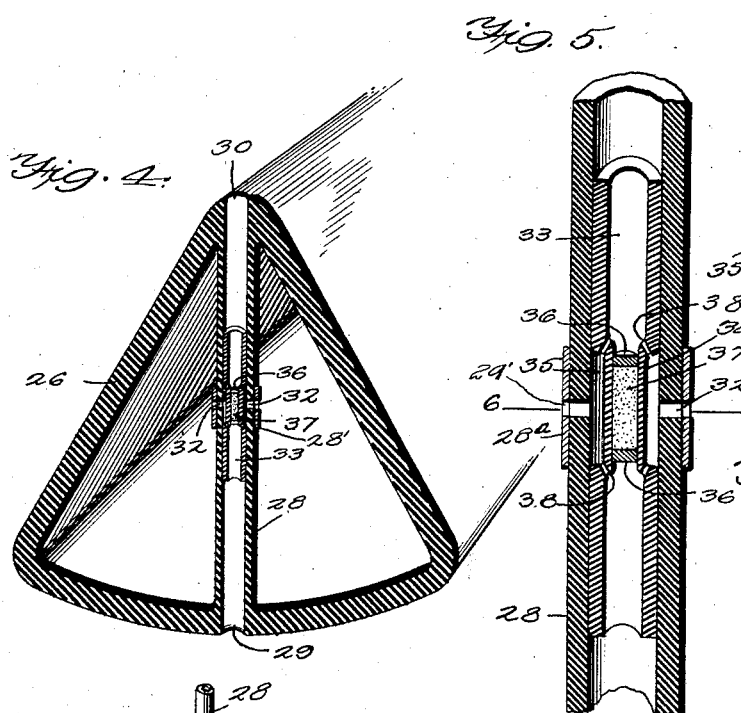
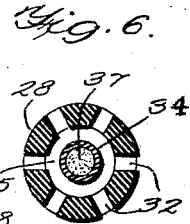
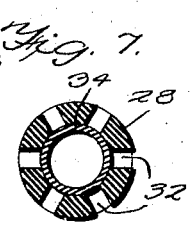
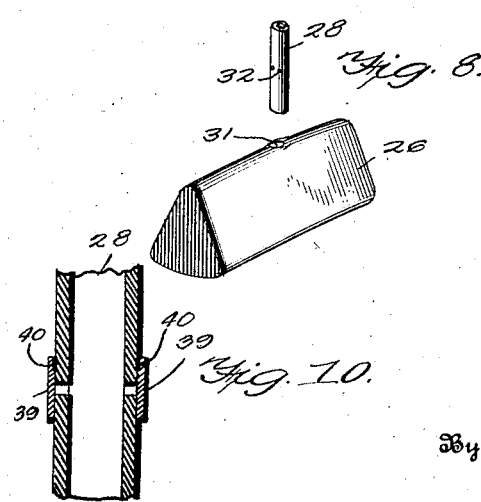
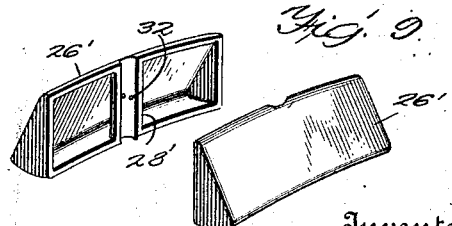
Inventor
William H. Richards,
By
Attorney

UNITED STATES PATENT OFFICE.

WILLIAM HENRY RICHARDS, OF KNOXVILLE, TENNESSEE.

PNEUMATIC TIRE.

1,362,187.

Specification of Letters Patent.   Patented Dec. 14, 1920.

Application filed January 21, 1920. Serial No. 352,936.

*To all whom it may concern:*

Be it known that I, WILLIAM HENRY RICHARDS, a citizen of the United States, residing at Knoxville, in the county of Knox and State of Tennessee, have invented certain new and useful Improvements in Pneumatic Tires, of which the following is a specification.

My invention relates to improvements in pneumatic tires, and has particular reference to a pneumatic tire of the multi-cell type.

An important object of the invention is to provide a tire of the above mentioned character, which presents certain improvements and advantages over the pneumatic tire shown and claimed in my co-pending application, for pneumatic tires, Serial No. 297,796, filed May 17, 1919.

A further object of the invention is to provide a plurality of cells, for filling a tire casing, of any well known or preferred type, which cells are so constructed and shaped that they are adapted to be assembled in a proper interfitting manner within the tire casing, and may be properly inflated after being introduced within such tire casing.

A further object of the invention is to provide means whereby an inner passage is afforded at or between the apexes of the several assembled cells, to permit of the radial expansion of the cells, and their proper inflation.

A further object of the invention is the provision of means for so locating the inflating element or valve of the cell that the same will not be closed by the contacting of the several cells.

A further object of the invention is to provide means to permanently close the air inlet means of each cell, after the several cells have been properly inflated.

A further object of the invention is to provide a cell of the above mentioned character, which is simple in construction, strong and durable.

Other objects and advantages of the invention will be apparent during the course of the following description.

In the accompanying drawings forming a part of this specification, and in which like numerals are employed to designate like parts throughout the same, Figure 1 is a prespective view of a pneumatic tire embodying my invention, parts being in section, and parts broken away, Fig. 2 is a transverse section through the same, Fig. 3 is a side elevation of two of the cells, Fig. 4 is an enlarged central transverse section through one cell, Fig. 5 is a further enlarged longitudinal section through the inflating tube of the cell, Fig. 6 is a horizontal section taken on line 6—6 of Fig. 5, before the expansion of the gas capsule, or cartridge, Fig. 7 is a similar view, after such expansion, Fig. 8 is a perspective view of one cell, showing the method of inserting the inflating tube therein, Fig. 9 is a similar view of the sections of the cell, showing a slightly different method of forming the same, Fig. 10 is a longitudinal section through the inflating tube, showing a different form of means for closing the openings thereof, and, Fig. 11 is a side elevation, upon a small scale, of a plurality of the cells, arranged to break joint.

In the drawings, wherein for the purpose of illustration is shown a preferred embodiment of my invention, the numeral 15 designates the felly of a wheel, such as an automobile wheel, having spokes 16. This felly carries a rim 17, shown as of the clencher type, while it may be of any other suitable type.

The numeral 18 designates a tire casing or shoe, of any well known or preferred type, having beads 19, arranged between and held within the flanges 20 of the rim.

It is preferred to render the tire casing 18 air tight, or substantially so, and this may be accomplished by arranging a strip 21, between the beads 19, such strip having tapered grooves or openings 23, to receive the inner ends of the beads. The numeral 24 designates the tubular stem of an ordinary inflating valve, which is connected with the strip 21, and supplies air under presure to the interior of the tire casing, which air passes to the interior of the several cells, to be next described. The inflating valve is of course equipped with the ordinary check valve, and carries the usual dust cap 25.

The numeral 26 designates my improved cells, which are preferably tapered or segmental, and decrease in width inwardly.

These cells are preferably formed from rubber having no fabric or non-elastic material incorporated therewith. The walls of the cells are preferably constructed relatively thick, so that they will retain their shape while being handled, prior to inflating. However, the thickness of these walls may be widely varied, as may be found advantageous. The cells 26 are arranged in annular groups, and while I have shown six of these cells in one group, it is to be understood that this number may be widely varied. The cells, normally or before inflation, have a substantially shorter radius than the interior of the tire casing, thus affording an inner annular inflating passage 27, which aids in the free inflation of the cells, and permits of their inward radial expansion, as will be described. The cells 26 of the several annular sets are preferably arranged to break joint, as indicated in Fig. 11, whereby in the event of one cell in a set becoming punctured or leaking, the cells in that set would ordinarily automatically circumferentially adjust themselves, by expansion, to fill the space ordinarily occupied by the deflated cell. However, the invention is in no sense restricted to this arrangement.

Each cell 26, as more clearly shown in Fig. 4, is provided with a radial inflating tube 28, also preferably formed of rubber, free from incorporation with the fabric. This radial inflating tube has its opposite ends open, as shown at 29 and 30, and communicate at these points, within the tire casing, exteriorly of the cell.

As shown in Fig. 8, the cell 26 is shown as molded in an integral form, and provided with openings 31, upon its inner and outer edges, for the reception of the ends of the inflating tube 28, which are inserted therein, and subsequently suitably vulcanized to the walls of the openings 31.

In Fig. 9, I have shown the cell 26 as formed in sections 26', having radial tube sections 28', which are molded integral therewith. These sections are subsequently assembled and suitably vulcanized, for forming in effect an integral unit.

Each inflating tube 28 is provided preferably near its center, with an annular set of radial openings 32, shown more clearly in Fig. 5. The air supplied to the interior of the tire casing, under pressure, passes into the radial inflating tube 28, and through openings 32, to the interior of the cell.

Means are provided to permanently close the openings 32, after the cell has been properly inflated, comprising a tubular member 33, preferably formed of rubber having no fabric incorporated therein. This tubular member may be held in place within the inflating tube 28, by frictional engagement therewith, or other securing means may be employed, if desired. The tubular member 33 has an intermediate portion 34, of smaller diameter, with an annular recess 35, extending about the same, in communication with the openings 32. The exterior surface of the intermediate portion 34 is preferably coated with cement, so that when the portion 34 is brought into contact with the inner wall of the tube 28, under pressure and in the presence of heat, these two elements will become vulcanized together. The intermediate portion 34 may be formed of partly cured rubber, which is completely cured, by the application of heat and pressure, to vulcanize the same to the inflating tube 28, the intermediate portion of which may be wholly or partly cured rubber. The ends of the intermediate portion 34 are closed by plugs 36, suitably held therein, forming a closed capsule or cartridge, for receiving a heat expanding chemical 37, such as chlorid of ammonia, as shown. The intermediate portion 34 has openings 38, through the opposite ends thereof, which connect the interior of the tubular member 33, and the space 35. The intermediate portion of the tube 28 is preferably surrounded by a fabric band 28', held in place by frictional engagement therewith, and having openings 29', in registration with the openings 32. The purpose of this band is to prevent the undue expansion of the tube 28, upon the expansion of the chemical holding cartridge, but this band may be dispensed with, and the extent of expansion of the cartridge adjusted by regulating the amount of chlorid of ammonia, placed in the cartridge.

In Fig. 10, I have dispensed with the holding member 33 and associated elements, and placed an annular valve sleeve 39, about the intermediate portion of the tube 28, to cover the openings 32. One end of the valve sleeve 39 may be cemented to the tube 28, as shown at 40, while its opposite end is free from connection therewith. The valve sleeve 39 will permit the air to pass through the openings 32 into the cells, but will prevent its movement in an opposite direction from the cell, the same serving as a check valve.

The operation of the device is as follows: The cells 26 are arranged and assembled in the outer casing 18, as before described, and shown in Figs. 1 and 2. The cells are inflated after insertion within the casing, and for this purpose an air pump is connected with the inflating valve 24. The air under pressure, first enters the tire casing 18, exteriorly of the cells 26, and is free to pass radially between the cells, and about the inner and outer ends of the same. The compressed air enters the opposite ends of the inflating tubes 28, which are open, and then passes through the tubular member 33, openings 38, and openings 32 to the interior of the cells. After a suitable pressure has thus been supplied to the cells within the casing, interiorly and exteriorly thereof, such as fifty pounds to the square inch, the stem 24 is disconnected from the air pump and connected with a suitable source of heated compressed air, having a pressure exceeding fifty pounds to the square inch. This air is preferably heated to 100° F. The heated air will now enter the inflating tube 28, and passing through the apertures 38, enter the surrounding spaces 35, and then pass to the interior of the cell. The heated gases act upon the chlorid of ammonia in the cartridge, causing the intermediate portion 34 to expand, whereby its outer surface, coated with cement, is brought into engagement with the interior of the tube 28, and in the presence of the heat and pressure, is vulcanized to the tube 28, thus permanently closing the openings 32. This heating process may be continued for a suitable length of time, and I have found that satisfactory results are obtainable by introducing the air heated to 100° F. and continuing the introduction until the tire is inflated to about sixty or seventy pounds, and then cutting off the supply of heated air, the heated air within the tire casing, gradually cooling.

I also contemplate inflating the cells 26, by the use of the inflating apparatus, shown in my co-pending application for combined inflating apparatus and tire carrier, filed November 10, 1919, Serial No. 336,815. In this event, the strip 21 for rendering the tire casing air tight, may be dispensed with. It is to be understood that the forms of my invention herewith shown and described, are to be taken as preferred examples of the same, and that various changes in the shape, size, and arrangement of parts may be resorted to without departing from the spirit of my invention, or the scope of the subjoined claims.

Having thus described my invention, I claim:

1. A pneumatic tire comprising, a tire casing, separate segmental cells arranged within the tire casing, a radial inflating tube extending through each cell and having its ends open and in communication with the interior of the tire casing, said radial tube having means of communication with the interior of the cell, and means for introducing air under pressure into the tire casing exteriorly of the cells.

2. A pneumatic tire comprising, a tire casing, separate segmental cells arranged within the tire casing, each cell normally having a shorter radius than the radius of the interior of the tire casing for forming an inner annular inflating passage, a radial inflating tube arranged in each cell and having communication with the interior thereof for supplying compressed air to the same and having its inner end open and in communication with the inner annular inflating passage, means discharging into the interior of the tire casing and being free from connection with the cells and adapted to supply compressed air to the casing exteriorly of the cells, such compressed air passing through the inflating tubes to the interior of the cells, and means to prevent the passage of the compressed air from the interior of the cell through said means of communication to the inflating tube.

3. A pneumatic tire comprising, a tire casing, separate segmental cells arranged within the tire casing, each cell normally having a shorter radius than the radius of the interior of the tire casing for forming an inner annular inflating passage, each cell being radially extensible, a radial inflating tube extending within each cell and having its inner end leading into the inner annular inflating passage, and means for controlling communication between the interior of the inflating tube and the interior of the cell.

4. A pneumatic tire comprising, a tire casing, separate cells arranged within the tire casing, an inflating element arranged within each cell and having communication with the interior of the tire casing and having an opening leading into the cell, means for supplying air under pressure into the tire casing exteriorly of the cells, and means for permanently closing the opening of the inflating element after the inflating of the cell.

5. A pneumatic tire comprising, a tire casing, cells arranged therein, an inflating tube in each cell having an opening in communication with the interior of the cell, an expansible element arranged within the inflating tube in proximity to said opening and adapted to cover the same, a heat expanding chemical within the expansible element, and means for supplying air under pressure to the interior of the tire casing exteriorly of the cells.

6. In a pneumatic tire, as a sub-combination, a cell for arrangement within the tire casing, an inflating tube arranged within the cell and having one end open and provided with an opening leading into the cell, a capsule or cartridge formed of rubber arranged within the inflating tube in proximity to said opening and having its exterior surface coated with cement, and a heat expanding chemical held within the capsule.

7. In a pneumatic tire, as a sub-combination, a cell, an inflating tube arranged within the cell and having an opening in communication with the interior of the cell, and heat actuated means for closing said opening.

8. In a pneumatic tire, as a sub-combination, a cell, an inflating tube extending through the cell and having its opposite ends open for communication with the interior of the tire casing, said inflating cell being provided between its ends with an opening leading into the interior of the cell, and separate means to close said opening.

9. In a pneumatic tire, as a sub-combination, a cell, an inflating tube extending therethrough, and provided with openings disposed within the cell, a tubular member arranged within the inflating tube and having a contracted intermediate portion disposed adjacent said openings forming an annular space between it and the openings, said tubular member having apertures arranged at the ends of the contracted portion, the outer surface of the contracted portion being coated with cement, and a heat expanding chemical held within the contracted portion.

10. In a pneumatic tire, as a sub-combination, a cell, an inflating tube extending through the cell and having its opposite ends open and terminating with the exterior surface of the cell, said tube having openings arranged within the cell, and means to cover said openings.

11. In a pneumatic tire, as a sub-combination, a radial segmental cell, and a radial inflating tube arranged therein with its opposite ends open and terminating substantially with the exterior surface of the cell, said tube having means of communication with the interior of the cell.

12. In a pneumatic tire, a tire casing, a plurality of separate cells arranged therein, each cell having separate means of communication with the interior of the tire casing, means for introducing air under pressure into the tire casing exteriorly of the cells, and means for closing the means of communication of each cell upon the introduction of heat into the cell.

13. In a tire casing, as a sub-combination, a cell, an inflating tube arranged therein and connecting opposite portions of the cell, said tube having its ends open and provided between its ends within the cell and spaced substantial distances from the opposite portions thereof with opening means, and a valve means to cover the opening means.

In testimony whereof I affix my signature.

WILLIAM HENRY RICHARDS.

Witnesses:
N. FRED MCMILLAN,
C. H. MURPHY.